Oct. 26, 1926.
L. D. WOODRUFF
BALL JOINT
Filed Dec. 8, 1922
1,604,867
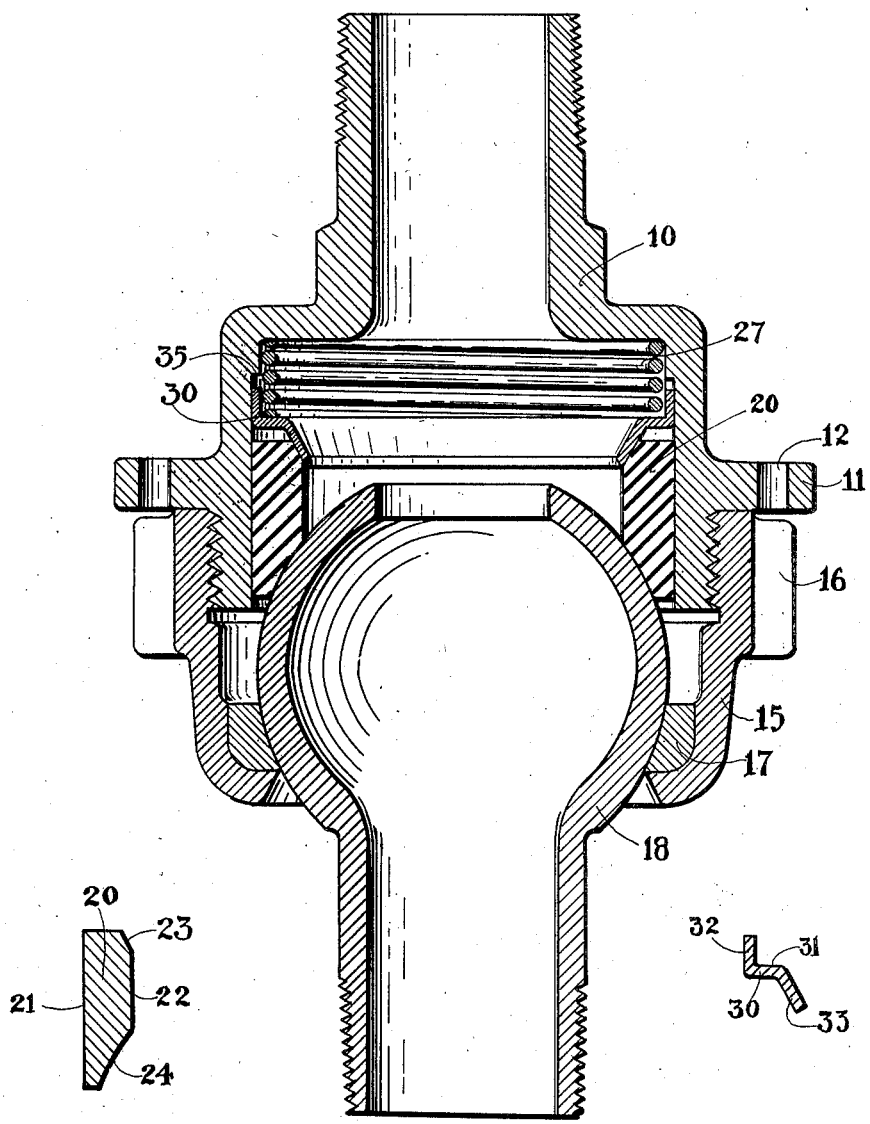
Inventor
Leonidas D. Woodruff
By Church & Church
His Attorneys Patented Oct. 26, 1926.

1,604,867

UNITED STATES PATENT OFFICE.

LEONIDAS D. WOODRUFF, OF CHICAGO, ILLINOIS, ASSIGNOR TO ADELINE R. WOODRUFF, OF CHICAGO, ILLINOIS.

BALL JOINT.

Application filed December 8, 1922. Serial No. 605,672.

This invention relates to ball joints, particularly those for use in the steam line of railway cars. The object of the present invention is to provide an efficient ball joint embodying a one-piece tubular gasket which may wear down without binding and may leak water when cold. Other objects of the present invention concern the various elements of the joint per se, particularly the anti-vibration ring which prevents the gasket from pounding its upper outer edge against the casing wall, and the lower metal bearing ring which serves as a loose collar for the ball when the ball turns about its longitudinal axis.

Up to the present time extensive tests by the inventor of the present device as well as by many other engineers have failed to develop a practical one-piece cylindrical gasket adapted to ride on top of a movable ball in a steam line ball joint. The general reason for the shortness of life of such a gasket has been that when the ball moves upwardly and to one side, the gasket, instead of sliding loosely on the ball, tends to follow the ball due to the cohesive friction of the gasket against the outer spherical surface of the ball and consequently the gasket itself partakes of the movement of the ball with a consequent crushing of the top outer edge of the gasket in the line of the thrust against the cylindrical inner wall of the main body or top casing section of the joint.

The rapid wear of the relatively soft gasket is greatly increased by the presence in the joint of tiny bits of grit, cinders, and sand so that as the gasket scours the cylindrical wall of the top member of the shell or casing the bits of grit, etc., acting like emery or sandpaper wear away the outer top edge so that the vibrating movement of the gasket soon leaks steam in small volume and then the grit and cinders follow the line of leakage with the pressure of steam behind them and soon cut a passageway in the outer cylindrical surface of the gasket destroying its usefulness.

In the present invention a spring holds the relatively long gasket in place and there is provided between the spring and gasket an annular metal plate loosely engaging the wall of the casing and extending somewhat short of the inner surface of the gasket, thereby preventing access of cinders, sand, and grit to the upper surface of the gasket.

In the drawing,—

The figure shows a central section through a preferred embodiment of the invention.

The body 10 forms the top member of the casing and is of quite standard formation having a plurality of lugs 11 perforated as at 12 to receive a cotter pin to lock the top section 10 against relative rotation with the cap 15, the latter having a plurality of outstanding lugs 16 to engage the cotter pins. The bearing ring 17 seated in the bottom of the cap 15 or lower member of the casing supports the weight of the ball member 18 and the associated piping usual in train service. The ring 17 differs from ordinary practice in that it is found advisable to allow the bearing ring 17 to act as a swivel by finishing the surface of the cap to such an extent that the bearing ring will have greater friction against the ball when the latter is rotated about its longitudinal axis than it has against the horizontal and vertical walls of the sleeve or lower member of the casing.

The gasket 20 is preferably formed of a rubber compound which is quite hard when cold and has the property of expanding equally in all directions to a fairly considerable extent when heated to the usual temperature present in steam lines. The contraction and expansion of the gasket is quite desirable, not only that the gasket may more readily feed down against the ball to compensate for wear but for the more important purpose of permitting escape of trapped condensed water. Since the hose is usually at the lowest point on the train line it is quite important to drain the water when the steam is off in order that this trapped water may not freeze with a possible interference to the operation of the train line.

As shown in the figure, the gasket has a cylindrical outer surface 21 to engage loosely the wall of the body 10, a concentric wall 22 and flat top and bottom walls, the top wall being reduced by the provision of a conical surface 23 and the bottom surface being reduced by a tapered and preferably spherical surface 24 adapted to engage snugly the ball when the steam pressure is applied and the gasket consequently expanded and somewhat flexible. Above the gasket is mounted a helical spring 27 having for its particular purpose the duty of maintaining the anti-vibration ring or plate 30 in contact with the gasket so that the plate 30 may prevent the gasket following the movement of the ball with consequent damage to the upper outer edge of the gasket.

The anti-vibration plate 30 is an annular member having a plane central annular seat 31 for reception of the spring, a cylindrical flange 32 which fits snugly against the finished wall of the top member of the casing and also has an inwardly and downwardly tapered conical portion 33 which engages the tapered portion 23 of the gasket and consequently tends to urge the upper outer edge of the gasket into contact with the cylindrical wall of the body 10.

It will be noted from the figure that the diameter of the bore of the cap is materially greater than the diameter of the bore of the body and also that the lower edge of the body extends to a point short of the horizontal central plane of the ball, that is, a plane passing through the center of the sphere at right angles to the axis of the ball member. The advantage of this construction is that as the gasket 20 wears down the lower edge may extend into the cavity provided by the larger bore of the cap 15 and hence a binding of the ball and gasket is entirely obviated.

It has been found advisable to form a shoulder 35 in the upper member of the casing to form a stop for the anti-friction ring 30 under direct upward thrust. This shoulder is formed by stopping the boring of the wall of the casting at a point short of the horizontal portion of the body.

Since the rubber gasket 20 does not take any of the weight of the ball and since the anti-friction ring 30 prevents the pounding of the upper outer edge and also prevents access of dirt and grit of all kinds to such outer edge, the only portion of the gasket to wear is the spherical surface 24 which is worn by the constant friction of the ball against it, but as the gasket wears it is fed down against the ball by the spring 27 so that the life of the gasket is extremely long, being many times greater than any other gasket known to the inventor.

At such time as it is necessary to renew the gasket the process of doing so is extremely simple and it is not at all necessary to unscrew the ball from its piping as by removal of the cotter pin and the unscrewing of the two sections 10 and 15 of the casing, the new gasket 20 may readily be slipped into place and the casings again closed. No particular adjustment is necessary in applying the new gasket as the two sections of the casing may be screwed together tightly without binding the ball or gasket in any way, the spring 27 compensating for any difference in position between the old and the new gasket. Since the joint usually, although not necessarily, hangs vertically the steam pressure when on, keeps the gasket firmly seated on the ball and also holds the ball firmly against the bearing ring 17.

The action of the joint is relatively simple. Should the ball be forced upwardly to the right as viewed in the figure and simultaneously given a clockwise rotation, the gasket would tend to follow the rotation of the ball and would transmit such motion to the anti-vibration ring held in contact with the gasket by the spring 27. Since this ring 30 fits snugly against the wall of the cylindrical bore of the top casing member 10, the movement of the anti-vibration ring is promptly arrested and this resistance conveyed to the gasket on the opposite side, i. e., the left of the figure, by a surface substantially normal to the direction of the force acting, since the apex of the cone of which the portion 33 is a zone or frustum surface is in line with and near the center of the sphere of the ball member 18. The arresting of the motion of the gasket in this way causes it to resist the friction against the ball and to remain quiet but in contact with the ball. The spring 27 is comparatively light as it does not stabilize the gasket by direct pressure but merely keeps the anti-vibration ring in contact with the gasket, the ring, as stated being the real stabilizing agent.

What I claim is:

1. A ball joint of the two-casing type, characterized by the provision of an anti-vibration ring having an inclined gasket engaging surface, a cylindrical casing engaging flange, said ring enclosing the adjacent end of the gasket and an intermediate portion spaced from the upper edge of the gasket.

2. A ball joint of the two-casing type, characterized by the provision of an anti-vibration ring having a conical gasket engaging surface and having additional means for engaging the wall of the casing at a point spaced from the edge of the gasket the end of the gasket being enclosed by said ring, and said ring having an intermediate portion spaced from and out of contact with the upper edge of the gasket.

3. A gasket retaining ring having an annular spring engaging central portion spaced from the upper edge of the gasket, an outer upstanding casing engaging flange, and an inner conical gasket engaging flange contacting with the inner face of the gasket to urge the latter toward the casing.

4. A gasket retaining ring for a steam line ball joint characterized by the provision of a flat annular seat for a spring, said annular seat being spaced from the upper edge of the gasket, an outer cylindrical flange adapted to engage a casing and an inner gasket wedging flange, said flanges extending from the seat portion of the ring in opposite directions.

5. In combination, a hollow ball, a body, a cap, a metal bearing ring rotatable in said cap and supporting said ball, a cylindrical gasket having its top and bottom inner edges tapered with an intermediate portion of its inner face concentric to its cylindrical outer face, a spring in said casing and an annular spring plate having a central spring engaging portion spaced from the upper edge of the gasket, a cylindrical casing engaging portion and a conical portion adapted to engage the top inner tapered face of the gasket to wedge said gasket against said casing, said spring urging said gasket downwardly into contact with the ball.

LEONIDAS D. WOODRUFF.